(12) United States Patent
Fruth

(10) Patent No.: US 8,905,744 B2
(45) Date of Patent: Dec. 9, 2014

(54) TRANSPORT CONTAINER

(75) Inventor: Carl Fruth, Parsberg (DE)

(73) Assignee: Sintermask GmbH, Parsberg (DE)

(*) Notice: Subject to any disclaimer, the term of this patent is extended or adjusted under 35 U.S.C. 154(b) by 293 days.

(21) Appl. No.: 13/262,296

(22) PCT Filed: Mar. 31, 2010

(86) PCT No.: PCT/EP2010/002066
§ 371 (c)(1),
(2), (4) Date: Nov. 21, 2011

(87) PCT Pub. No.: WO2010/112213
PCT Pub. Date: Oct. 7, 2010

(65) Prior Publication Data
US 2012/0119399 A1  May 17, 2012

(30) Foreign Application Priority Data

Mar. 31, 2009 (DE) .................. 10 2009 015 130

(51) Int. Cl.
*B29B 13/08* (2006.01)
*B29C 67/00* (2006.01)
(52) U.S. Cl.
CPC ......... *B29C 67/0077* (2013.01); *B29C 67/0085* (2013.01)
USPC ........ 425/174.4; 425/182; 425/385; 264/308; 264/112
(58) Field of Classification Search
USPC ........ 425/182, 174.4, 385; 264/308, 112, 401
See application file for complete search history.

(56) References Cited

U.S. PATENT DOCUMENTS

| 6,824,714 | B1 | 11/2004 | Türck et al. |
| 6,861,613 | B1 | 3/2005 | Meiners et al. |
| 7,168,935 | B1* | 1/2007 | Taminger et al. ........ 425/174.4 |
| 7,204,684 | B2 | 4/2007 | Ederer et al. |
| 7,357,629 | B2 | 4/2008 | Weiskopf et al. |
| 7,946,840 | B2 | 5/2011 | Perret et al. |
| 2004/0045941 | A1* | 3/2004 | Herzog et al. ............ 219/121.6 |

(Continued)

FOREIGN PATENT DOCUMENTS

| DE | 199 39 616 A1 | 3/2001 |
| DE | 100 47 615 A1 | 4/2002 |

(Continued)

OTHER PUBLICATIONS

International Search Report of PCT/EP2010/002066, Dated Sep. 27, 2010.

*Primary Examiner* — Joseph S Del Sole
*Assistant Examiner* — Nahida Sultana
(74) *Attorney, Agent, or Firm* — Laurence A. Greenberg; Werner H. Stemer; Ralph E. Locher

(57) ABSTRACT

A transport container for use in a device for producing a three-dimensional object of selective solidification of a build-up material deposited in layers, in which the device has a process chamber closed during operation, where the three-dimensional object is produced in layers. The transport container has a container, in which a height-adjustable platform is arranged, on which the three-dimensional object is produced in layers. The process chamber has first and second sections in which the second section can be separated from the first section and operated in a separate state independently from the device and also can be connected to the first section to produce an operating state of the device.

10 Claims, 3 Drawing Sheets

(56) References Cited

U.S. PATENT DOCUMENTS

| | | |
|---|---|---|
| 2006/0022379 A1 | 2/2006 | Wicker et al. |
| 2007/0057412 A1* | 3/2007 | Weiskopf et al. ............. 264/497 |
| 2007/0077323 A1* | 4/2007 | Stonesmith et al. ....... 425/174.4 |
| 2008/0150192 A1* | 6/2008 | Perret et al. ................... 264/308 |
| 2008/0169589 A1* | 7/2008 | Sperry et al. .................. 264/494 |
| 2008/0190905 A1 | 8/2008 | Heinlein |
| 2011/0272857 A1* | 11/2011 | Sperry et al. .................. 264/308 |

FOREIGN PATENT DOCUMENTS

| | | |
|---|---|---|
| DE | 10 2004 057 866 A1 | 6/2006 |
| EP | 1 704 989 A2 | 9/2006 |
| WO | 01/07239 A1 | 2/2001 |
| WO | 02/36330 A1 | 5/2002 |
| WO | 2007/003244 A1 | 1/2007 |
| WO | 2008/061732 A1 | 5/2008 |

\* cited by examiner

TRANSPORT CONTAINER

BACKGROUND OF THE INVENTION

Field of the Invention

The invention relates to a transport container. The invention furthermore relates to an apparatus, comprising such a transport container, for manufacturing a three-dimensional object by selective solidification of a build material applied in layers, and to a method for manufacturing a three-dimensional object by means of such an apparatus.

Layered build methods serve to manufacture components built up in layers from solidifiable material such as resin, plastic, metal, or ceramic, and are used, for example, to fabricate engineering prototypes.

Apparatuses for manufacturing a three-dimensional object by selective solidification of a build material applied in layers are known from the existing art; such apparatuses comprise a process chamber that is closed in the operating state and in which the three-dimensional object is built up in layers. The process chamber is also referred to as a "build chamber" or "build space." Units with which a layered building method of this kind is carried out are also referred to as "rapid prototyping" systems.

In a layer building method, layers of build material are applied successively one above another. Before application of the next layers in each case, the locations in the respective layers corresponding to the object being fabricated are selectively solidified. Solidification is accomplished, for example, by local heating of a powdered layering raw material. A radiation source is used, for example, for this. An exactly defined object structure of any conformation can be produced by introducing radiation in controlled and suitable fashion into the desired regions. The layer thickness is also adjustable. A method of this kind is usable in particular for manufacturing three-dimensional objects, by producing multiple thin, individually configured layers in succession. A layer building method of this kind is described, for example, in European patent EP 1015214 B1.

Efficient process sequences are a prerequisite for the use of layer building methods for additive fabrication of components. This applies both to the operating time of the layer building units and to final processing of the components built up in the layer building units. One problem with the final processing of objects that have been pro in a layer building unit is, for example, cooling of the objects after the layer building process.

The patent application WO 00/21736, relating to a laser sintering machine, proposes producing the object, produced in layers, on a build platform that is arranged in a replaceable receptacle. After a removal door is opened, the replaceable receptacle can be removed from the build space and cooled outside the sintering machine. Immediately after removal of the replaceable receptacle, a new replaceable receptacle can be inserted into the sintering machine. The down times between two building processes can thereby be shortened as compared with a conventional method in which cooling of the object occurs in the sintering machine. After a changeover period of approximately 15 to 20 minutes, the sintering machine is available for the next use. Removal and insertion of the replaceable receptacle is accomplished, in this context in a particularly complex manner, namely either manually or with the aid of a sliding carriage. In addition, a wide variety of compensation, centering, clamping, and pivoting mechanisms are needed, these being required for proper attachment and detachment of the replaceable receptacle to and from a carrier apparatus. The design outlay is, as a result, also comparatively large.

German patent application DE 10 2006 055 077 A1 describes a laser machine in which a replaceable receptacle of this kind is used. Handling of the replaceable receptacle is simplified as compared with the approach described above in that it is no longer necessary to reach into the build chamber in order to exchange the replaceable receptacle. For this purpose, the replaceable receptacle is attachable to a build chamber door, and is pivoted outward and inward upon opening and closing, respectively, of the build chamber door. The replacing position is now readily accessible. The replaceable receptacle no longer needs to be lifted out of the build chamber. Attachment and detachment of the replaceable receptacle are, however, still very complex, since on the one hand the replaceable receptacle must always be disengaged from the build chamber door, and connected to a drive system for vertical displacement of the platform, before the sintering machine can start up; and on the other hand, before receptacle replacement, first the connection between the replaceable receptacle and drive system must be disengaged and the connection between the replaceable receptacle and build space door must be established, so that the receptacle does in fact pivot out when the build space door is opened.

BRIEF SUMMARY OF THE INVENTION

An object of the present invention is to make a layer building method of this kind even more effective.

This object is achieved respectively by a transport container as claimed, and an apparatus as claimed and a method according to the present invention.

The transport container according to the present invention for use in or with an apparatus for manufacturing a three-dimensional object by selective solidification of a build material applied in layers, the apparatus comprising a process chamber, closed in the operating state, in which the three-dimensional object is produced in layers, is characterized in that the transport container comprises a receptacle in which is arranged a vertically displaceable platform on which the three-dimensional object is produced in layers; and that the transport container is embodied as a second section of the process chamber that is can be segregated from a first section of the process chamber, in the segregated state can be handled independently of the apparatus, and can be connected to the first section of the process chamber in order to establish the operating state of the apparatus.

The apparatus according to the present invention for manufacturing a three-dimensional object comprises a process chamber that is closed in the operating state and in which the three-dimensional object is manufactured, and is characterized in that the process comprises a first section and a second section embodied, as described above, as a transport container. The apparatus is, in particular, an apparatus for manufacturing a three-dimensional object by selective solidification of a build material applied in layers.

The method according to the present invention for manufacturing a three-dimensional object by means of an apparatus, the apparatus comprising a process chamber that is closed in the operating state and in which the three-dimensional object is manufactured, is characterized in that after partial or complete production of the object, a transport container as described above is segregated from a first section of the process chamber and, in the segregated state, is handled independently of the apparatus. The apparatus is, in particular, an apparatus for manufacturing a three-dimensional object by selective solidification of a build material applied in layers.

"Manufacture" of the object is understood here not only as production of the object in the narrower sense. Manufacture of the object instead also encompasses individual process steps before and/or after layer building and selective solidification, for example a modification, treatment, further processing and/or final processing of the objects produced, for example a temperature treatment such as cooling, a treatment using a modified process environment, a mechanical treatment, and others. The "process chamber" is thus understood not only as a build chamber in which the building of an object takes place, but also, for example, as a processing space, a cooling space, etc.

Advantageous embodiments of the invention are indicated in the dependent claims.

The advantages and embodiments explained below in connection with the method are also applicable analogously to the apparatuses according to the present invention, and vice versa.

The concept, known from the existing art, of the replaceable receptacle is no longer being pursued, since it has proven in practical use to be too complex and therefore unsuitable for mass production of objects by means of layer building methods.

A central idea of the invention is instead to use a part of the process chamber itself as an interchangeable transport container for the objects that are produced. For this, a portion of the process chamber is embodied so it can be segregated from the remainder of the process chamber and separately handled. The transport container is then particularly easy to transport. The interchanging and transport of the transport containers can preferably be automated, so that very effective production of objects, in particular including mass production, is possible.

If the transport container is embodied as a largely autonomous unit, and if, in particular, the transport container also encompasses the drive system for vertical displacement of the platform, then attachment to and detachment from the drive system become superfluous, thereby once again greatly reducing handling complexity as compared with the previously known approaches. At the same time, a permanently integrated mechanism for vertical displacement increases accuracy in the context of manufacture of the objects, since attachment and detachment of the receptacle to and from the mechanism are eliminated.

The invention encompasses not only the instance, also described below, in which the receptacle in which the platform is arranged is arranged in a kind of casing that serves as a process chamber boundary, but also the instance in which the receptacle itself is embodied as an interchangeable transport container—in other words, the receptacle walls serve as a process chamber boundary. In either instance, attachment of the transport container is the prerequisite for being able to establish the operating state of the apparatus. In other words, it is only after the transport container has been attached that production of the objects can begin, since the platform on which the object is built is arranged in the receptacle that is located in the transport container.

The invention is universally applicable to any layer building methods. It is particularly advantageous that despite the separately handleable transport container, the process chamber can be operated in the operating state at an operating pressure deviating from ambient pressure (negative or positive pressure), since the process chamber is once again closed off from the outside after the transport container has been attached.

The present invention eliminates the complex removal of the replaceable receptacles using a sliding carriage.

It is furthermore advantageous that a comparatively large opening of the process chamber is created after removal of the transport container, which opening makes possible easy cleaning of the process chamber as compared with approaches known from the existing art.

It is furthermore advantageous that a removal door is not necessary. The result is not only that complex sealing of the door is eliminated, but also that operating space outside the unit for opening the door is not required.

Because on the one hand no room needs to be provided in the process chamber for attaching and detaching an interchangeable receptacle, and on the other hand there is no need to provide clearances for removing an interchangeable receptacle, and since thirdly, in a preferred embodiment of the invention, there is also no need to provide room for attaching and detaching the mechanism for vertical displacement of the platform, the process chamber can be made very much more compact as compared with conventional systems, with the result that the overall size of a layer building apparatus can be considerably reduced.

A further advantage consists in simpler handling, as compared with replaceable receptacles known from the existing art, when the layer building method takes place at elevated temperatures, since the replaceable receptacles used hitherto became very hot and thus made handling very difficult, whereas the transport containers proposed by the invention are thermally insulated on the outside by their walls, and can therefore be handled substantially more easily.

The overall result of the present invention is that layer building methods can be made even more effective.

BRIEF DESCRIPTION OF THE SEVERAL VIEWS OF THE DRAWING

An exemplifying embodiment of the invention is further explained below with reference to the drawings, in which:

FIG. 4 schematically depicts a detached transport container.

DESCRIPTION OF THE INVENTION

Figure 1:
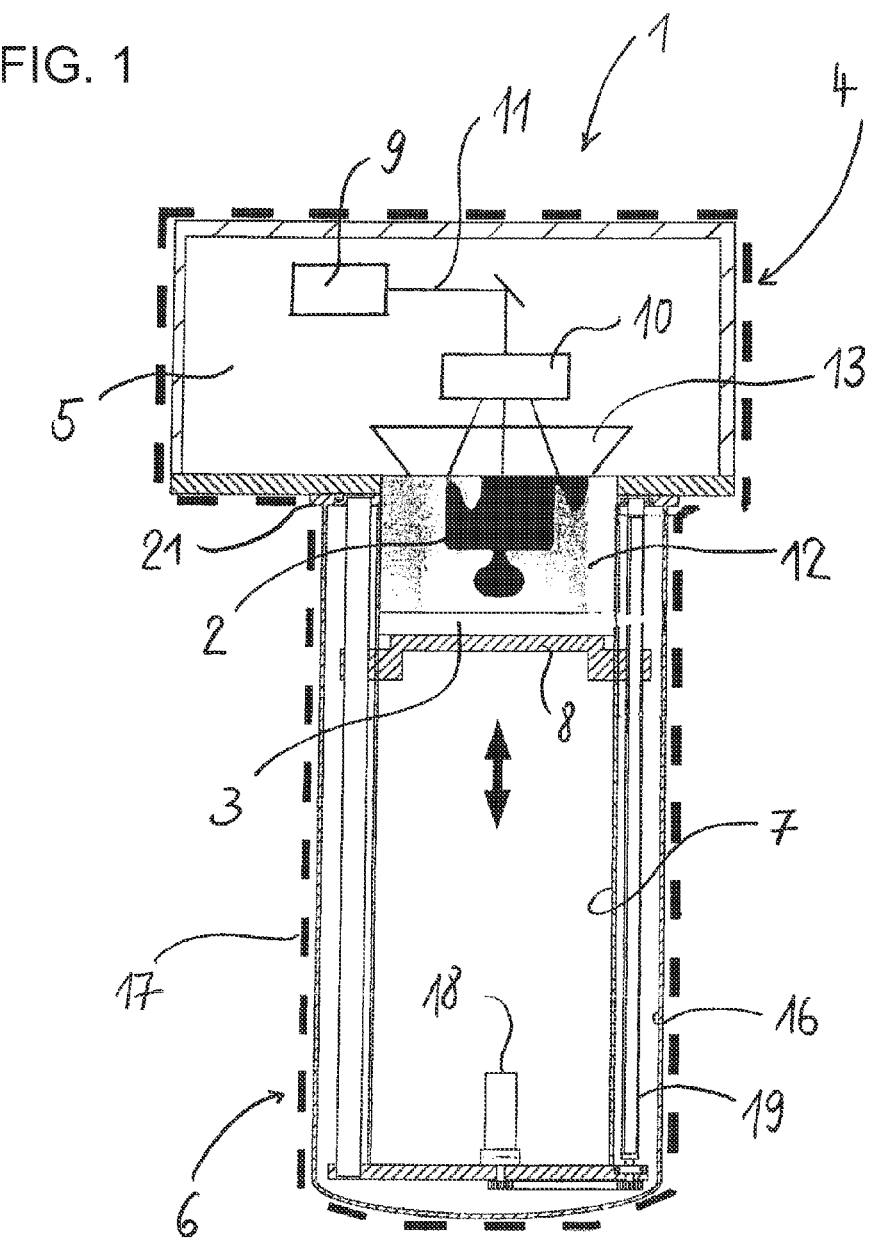
FIG. 1 schematically depicts an apparatus with a transport container, during production of an object.

All the Figures show the invention merely schematically and with its essential constituents. Identical reference characters correspond to elements having an identical or comparable function.

The invention can be used both in apparatuses that use and apparatuses that do not use a radiation source. FIG. 1 shows an apparatus 1 for manufacturing a three-dimensional object 2 by selective solidification of a build material applied in layers onto a plate-shaped substrate 3, using a radiation source, for example a laser. Apparatus 1 comprises a build chamber 4, closed in the operating state, in which three-dimensional object 2 is produced in layers. Build chamber 4 comprises a first section 5 and a second section embodied as a transport container 6. Transport container 6 comprises a receptacle 7 in which is arranged a vertically displaceable build platform 8 on which three-dimensional object 2 is produced in layers. In the example shown here, stepwise coating of a carrier substrate 3 that rests on platform 8 is occurring. It is, however, also possible to build object 2 directly on platform 8, in which case platform 8 then serves as a substrate.

The building of object 2 occurs with the use of a laser 9, arranged in the upper region of build chamber 4 and depicted schematically in FIG. 1, whose scanner 10 deflects laser beam 11 and focuses it onto platform 8 and onto sintering material 12 layered thereon. Sintering material 12 is, for this purpose, applied in layers onto substrate 3. A layer coater 13, likewise depicted only schematically, serves this purpose. The details of these components will, however, not be further discussed hereinafter, since on the one hand they are known to the skilled artisan and on the other hand the particular configuration of the layer building method is not critical for the present invention. For example, instead of a laser 9 a different radiation source, for example an infrared radiator, can be used. The radiation source can also be arranged outside build chamber 4, being coupled into build chamber 4, for example, through a region that is transparent to the wavelength being used. Transport container 6 can be segregated from first section 5 of building chamber 4, can be handled in the segregated state independently of apparatus 1, and can be (re)connected to first section 5 of build chamber 4 in order to establish the operating state of apparatus 1. First section 5 of build chamber 4 has for this purpose an opening 14 that corresponds to the contact-side opening 15 of receptacle 7 arranged in transport container 6. Wall 16 of transport container 6 serves, in the attached state, as a build chamber boundary. Boundary 17 of the entire build chamber 4 in the operating state is depicted schematically in FIG. 1 with a dashed line. A three-point mount (not depicted), implemented with the aid of three supports, guarantees stable support of apparatus 1 regardless of whether transport container 6 is attached or detached.

Transport container 6 comprises a device for vertical displacement of platform 8. With this, platform 8 is shifted vertically downward a corresponding amount in the shaft-shaped receptacle 7 after each layer is produced. The device for vertical displacement encompasses an electric-motor drive system 18 and a vertical displacement mechanism 19 connected on the one hand to drive system 18 and on the other hand to platform 8. Drive system 18 and mechanism 19 are entirely contained in transport container 6, so that the device for vertical displacement of platform 8 forms, with transport container 6, a physical unit that can be handled collectively.

In the detached state, transport container 6 is closed except for an opening 15, corresponding to the shape and size of receptacle 7, on its contact-side upper side 20. For connection of transport container 6 to the remainder of build chamber 5, transport container 6 comprises connecting elements for establishing a mechanical connection. It is particularly advantageous if these connecting elements are simultaneously embodied as sealing elements in order to constitute a connection, pressure-tight with respect to the surrounding environment, between transport container 6 and first section 5 of build chamber 4. If, as is the case in a preferred embodiment of the invention, there exists in build chamber 4 an operating pressure (for example, a pressure of between 0 and 6 bar) differing from ambient pressure, a further function of the connecting elements is that simultaneously with establishment of the mechanical connection, a sealing of build chamber 4 with respect to the surrounding environment also occurs. A sealing flange 21 is used, for example, as a connecting element. Flange 21, mounted on contact side 20 of transport container 6 and fitting around opening 15 of receptacle 7, seals the connection to the first build chamber section 5 in pressure-tight fashion. It is immaterial in this context whether a working gas or shielding gas, or air or a vacuum, is present in build space 4. In addition to connecting elements 21 on transport container 6 and corresponding connecting elements (not illustrated), coacting with connecting elements 21 of transport container 6, on first section 5 of build chamber 4, in an embodiment of the invention centering elements, for example in the form of centering pins 23, are provided on transport container 6 and/or on the corresponding attachment surface 22 of the stationary build chamber 5 in order to center transport container 6 with reference to first section 5 of build chamber 4 during connection. Centering pin 23 engages into a corresponding groove 24 on the transport groove. When transport container 6 is to be separated, the flange connection is released again.

It is particularly advantageous if transport container 6 is embodied in such a way that along with establishment of the mechanical connection to first section 5 of build chamber 4, an electrical and/or thermal connection to first section 5 of build chamber 4 is also simultaneously established. For example, electrical contact elements (not illustrated), which automatically become connected as a result of establishment of the mechanical connection, are provided on or alongside connecting elements 21 for establishing the mechanical connection between transport container 6 and first section 5 of build chamber 4, in such a way that automation-capable electrical coupling of transport container 6 to apparatus 1 is possible. Establishment of a thermal link ensures that the required operating temperature is present as quickly as possible in both sections of build chamber 4, i.e. both in transport container 6 and in first section 5 of build chamber 4.

If transport container 6 comprises at least one temperature sensor (not illustrated) and/or a heating and/or cooling device (not illustrated), temperature control of receptacle 7 is then possible in particularly simple fashion. In particular, preheating of receptacle 7 outside apparatus 1 is also possible. The heating and/or cooling device is preferably coupled to the temperature sensor for automatic establishment of the requisite temperature in transport container 6 and in receptacle 7. Preheating, or also cooling, of receptacle 7 in the detached state, i.e. independently of apparatus 1, is thus possible. Because the connectors for the heating or cooling system, and the sensor apparatus, are arranged outside build chamber 4, they are not subject to temperature stress and do not become fouled.

In a typical working sequence, transport container 6 filled with objects 2 (see FIG. 2) is detached from apparatus 1 and is subjected to a process for treating objects 2 contained in receptacle 7 of transport container 6. This can involve further processing or preparation of objects 2. For example, objects 2 can be taken out of receptacle 7 and have sintering material 12 removed from them, or can remain in receptacle 7 for cooling. After cooling, receptacle 7 is emptied, and transport container 6 can be used for a further manufacturing process.

Immediately after detachment of transport container 6, another transport container 6 can be attached onto apparatus 1. Changeover times are only a few minutes.

Attachment and detachment of transport container 6 are preferably accomplished automatically and, for example, with the aid of electrically driven interchanging systems (not illustrated) that automatically transport the detached transport containers 6 from apparatus 1 to a defined destination; a correspondingly embodied central control unit (not illustrated) or the like, which will not be discussed in further detail here, is provided for this purpose.

It is furthermore possible for transport container 6, after segregation from apparatus 1, to be connected to a second apparatus 1, identical in design to first apparatus 1 or at least compatible in terms of transport container 6, and for production of object 2 to be continued there or for a further object to be partly or entirely produced. It is thus possible, for example, in a very simple manner, to build multi-component objects 2 or objects 2 made of different materials by transporting object 2 back and forth between corresponding apparatuses 1. Because unnecessary attachment and detachment of drive system 18 for vertical displacement of platform 8 are eliminated according to an embodiment of the invention, the essential sources of undesirable inaccuracies in the context of object production are also eliminated, and it is easily possible to switch to a second or even third apparatus 1 and back. An off time during production of a single object 2 is, however, also readily achievable, for example when transport container 6 is reconnected to apparatus 1 after being segregated from apparatus 1, with no continuation of object production in the meantime. Instead, a processing or treatment of the object can occur in the interval, for example a temperature treatment.

Figure 2:
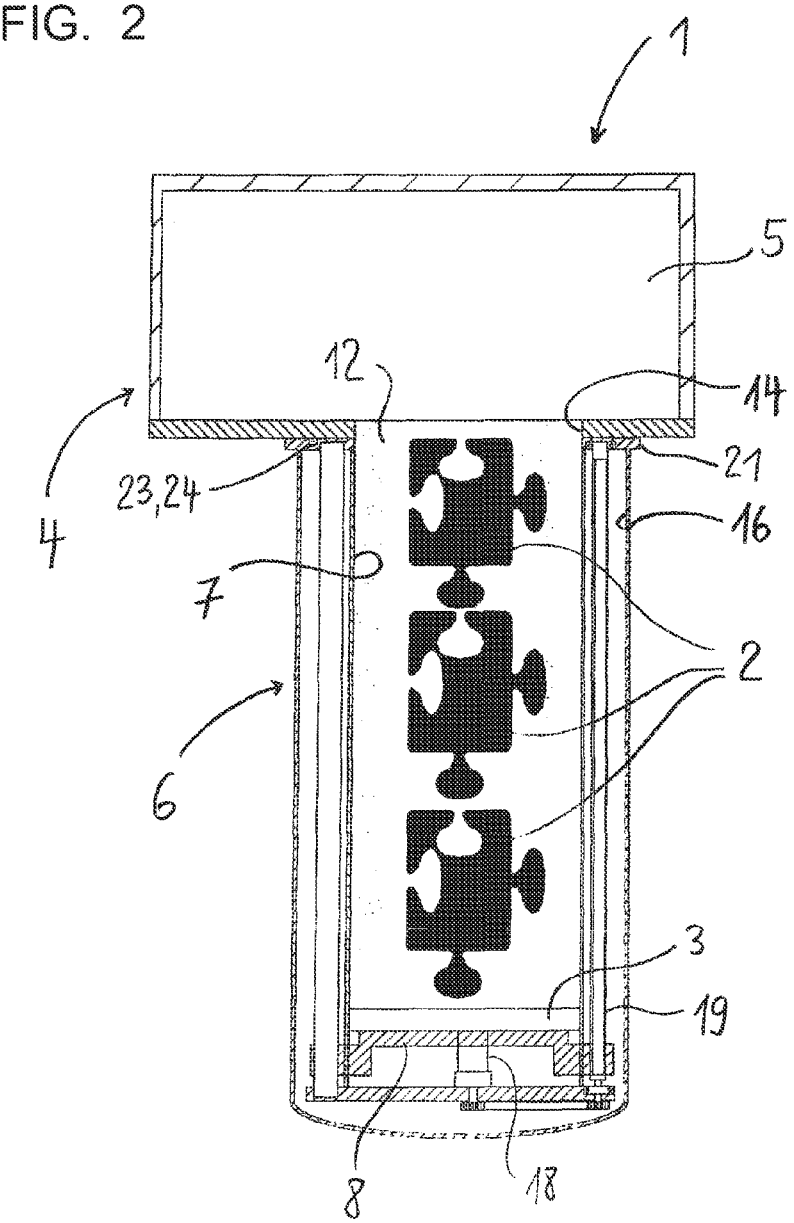
FIG. 2 schematically depicts an apparatus with a filled transport container, prior to attachment.
Figure 3:
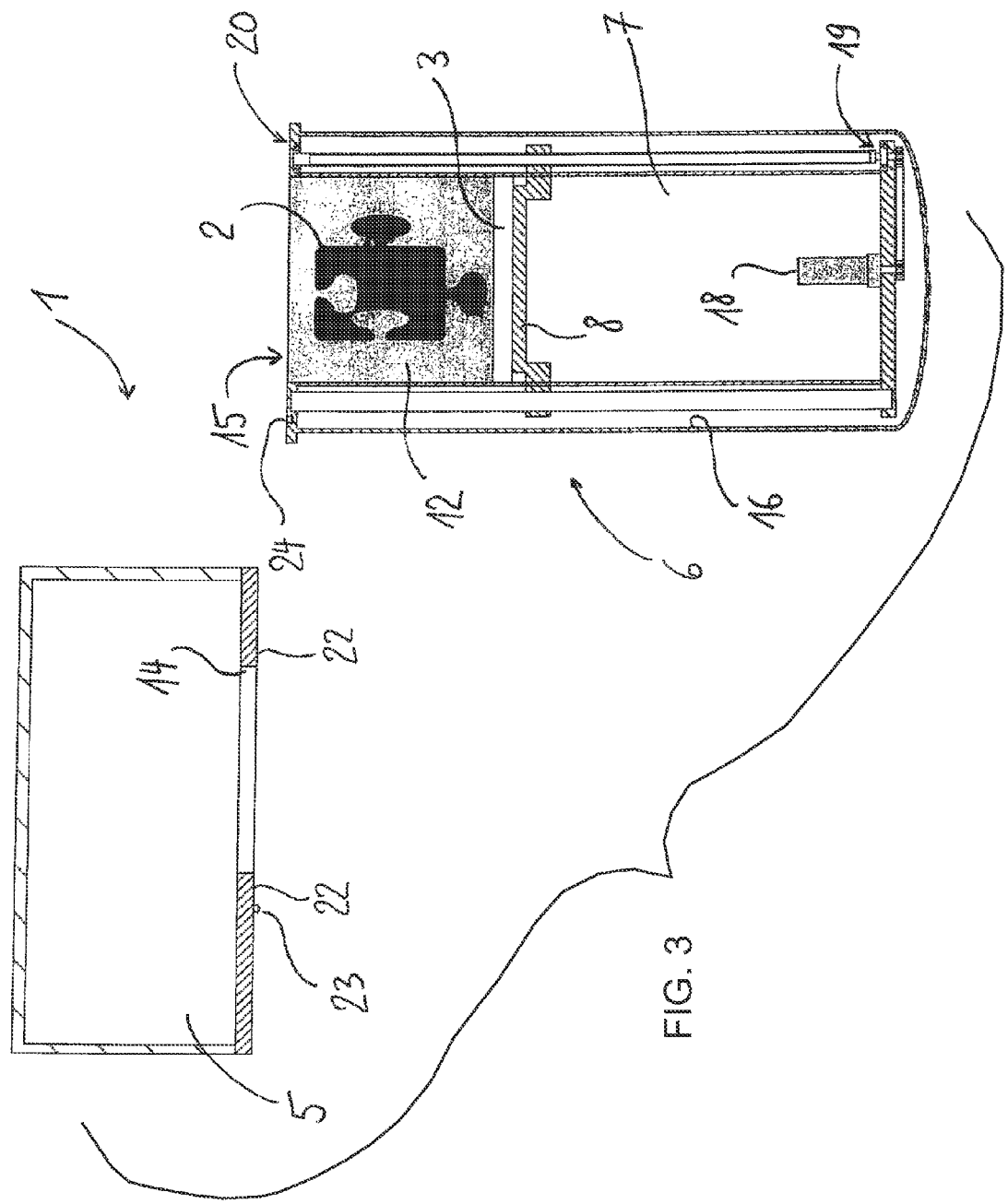
FIG. 3 schematically depicts an apparatus with a detached transport container.

Transport container 6 depicted in FIG. 1 or 2, which is only partly filled, can, for example, be detached at one phase of object manufacture, transported to a second apparatus 1, and attached to said second apparatus 1 in order to continue production of the object that has been started (FIG. 1), or else to manufacture a completely different object (FIG. 2). It would also be possible to connect transport container 6, after detachment and a manufacturing off time, back to the first apparatus 1. Manufacturing of objects 2 arranged in transport container 6 can, however, also be continued, after detachment, by way of a cooling operation or another further processing or final processing operation (FIG. 1, 2, or 3). In other words, after a first fabrication run transport container 6 can be used, without prior complete emptying, at further stations in the process sequence.

Many other working sequences are possible, and result in some cases from combinations of those described above.

A further embodiment of the invention in which transport containers 6 comprise identifying elements (not illustrated), which differentiate them from other transport containers 6, is particularly advantageous. These are preferably identifying elements for wireless identification, for example RFID transponders. If apparatuses 1 are also equipped with corresponding laser devices (not illustrated), and if the identifying element that has been read is transferred to the control unit, automatic detection of transport containers 6 and fully automatic control of the interchanging operations is possible. This allows mass production of components using layer building methods to be realized, for example in facilities having several dozen apparatuses.

All features presented in the specification, the claims that follow, and the drawings can be essential to the invention, both individually and in any combination with one another.

LIST OF REFERENCE CHARACTERS

1 Apparatus
2 Object
3 Substrate
4 Build chamber
5 First section of build chamber
6 Transport container
7 Receptacle
8 Platform
9 Laser
10 Scanner
11 Laser beam
12 Sintering material
13 Layer coater
14 Build chamber opening
15 Receptacle opening
16 Wall
17 Boundary of build chamber
18 Drive system
19 Vertical displacement mechanism
20 Container upper side
21 Connecting element
22 Contact surface of build chamber
23 Centering element on build chamber
24 Centering element on transport container

The invention claimed is:

1. An apparatus for making a three-dimensional object by selective solidification of a build material which is applied in layers, the apparatus comprising: a process chamber, closed in an operating state, for containing the three-dimensional object, said process chamber having a first section and a second section; said second section having a vertically displaceable platform for supporting the three dimensional object; said second section having a receptacle including said vertically displaceable platform; said second section being constructed as a transport container separable from said first section in a segregated state, said second section for being handled independent of the apparatus, said second section being connectable to said first section for use in the operating stage of the apparatus, said second section including connecting elements for mechanically connecting said second section to said first section, and said first section including connecting elements for coacting with said connecting elements of said second section; said connecting elements of said second section including sealing elements to form a pressure-tight mechanical connection with respect to the surrounding environment section.

2. The apparatus according to claim 1, wherein said second section includes a device for vertical displacement of said platform.

3. The apparatus according to claim 1, wherein further connecting elements of said second section also establish at least one of an electrical and thermal connection of said first section simultaneously with the mechanical connection.

4. The apparatus according to claim 1, wherein said second section includes at least one of a temperature sensor and a heating device and a cooling device to control temperature of said receptacle.

5. The apparatus according to claim 1, wherein said second section has an identifying element to distinguish said second section from other second sections.

6. The apparatus according to claim 1, including a reading device to automatically detect an identifying element of a second section.

7. A method for manufacturing a three-dimensional object, comprising the following steps:
providing an apparatus according to claim 1;
using the apparatus for selectively solidifying a build material by applying the material layers;
closing the process chamber in the operating state during which the three-dimensional object is being manufactured;
after one of partially or completely manufacturing the object, segregating the transport container from the first section into a segregated state; and
using the transport container independently of the apparatus.

8. The method according to claim 7, including the further steps of:
after segregating the transport container from the apparatus, connecting the transport container to a second apparatus, for continuing manufacture of the same or another object.

9. The method according to claim 7, wherein after segregating the transport container from the apparatus, reconnecting the transport container to the apparatus without any manufacturing of the object during the period of segregation.

10. The method according to claim 9, including the further step of applying a process for treating the object in the receptacle of the transport container between the period of segregating and reconnecting the transport container relative to the apparatus.

* * * * *